UNITED STATES PATENT OFFICE 2,528,932

COMPOSITIONS CONTAINING GLYCIDYL ETHERS

Quentin T. Wiles, Lafayette, and Herbert A. Newey, Richmond, Calif., assignors to Shell Development Company, San Francisco, Calif., a corporation of Delaware No Drawing. Application April 29, 1949, Serial No. 90,541

9 Claims. (Cl. 106—287)

This invention relates to a new composition of matter particularly adaptable for use as a cold-setting adhesive.

Glycidyl ethers of polyhydric phenols may be obtained by reacting epichlorhydrin with a polyhydric phenol and a base. Upon addition of a hardening agent, these glycidyl ethers cure without heating at ordinary atmospheric temperature to resinous materials of excellent physical and adhesive strength. However, such glycidyl ethers are either solid or substantially solid at such ordinary atmospheric temperatures. When employed for adhesive purposes, it is necessary that the glycidyl ether containing the hardening agent be at least spreadably fluid in order that it can be applied to surfaces desired to be united. The glycidyl ether may be heated to spreadable consistency and applied in this molten condition, but such a procedure is undesirable especially since the ether is capable of curing at ordinary atmospheric temperature. Obtaining fluidity by incorporation of an inert volatile solvent with the glycidyl ether is not practicable since the solvent cannot evaporate from the composition contained as an adhesive layer between usually impervious surfaces of objects being glued together. Moreover, the presence of even minute proportions of such volatile solvents retained in the ether greatly reduces the strength of the cured resin. Likewise, use of inert non-volatile solvents such as dibutyl phthalate to obtain fluidity also is unsatisfactory because the cured resin therefrom similarly has poor strength.

These and other difficulties in using glycidyl ethers of polyhydric phenols for adhesive purposes are now overcome by the composition of the present invention which in broad aspect is a spreadably fluid solution of glycidyl ether of a polyhydric phenol in admixture with a fluidizing proportion of a normally liquid, substantially non-volatile mono-epoxy compound. In this composition, the glycidyl ether has a 1,2-epoxy equivalency greater than 1.0 so as to be capable of curing to an infusible resinous material. Although the fluidizing mono-epoxy compound contains but a single epoxy group and is thus not capable of being resinified by itself to an infusible three-dimensional polymer, its presence does not adversely affect the physical properties of the cured composition. In fact, it was quite unexpectedly discovered that the impact strength and water resistance of the cured composition is materially improved by the presence of the mono-epoxy compound in the composition. Furthermore, the mono-epoxy compound remains in the composition during curing because of its substantially non-volatile character in having a boiling point of at least 100° C.

The glycidyl ethers of dihydric phenols employed in the composition are obtained by reacting at about 50° C. to 150° C. one to two or more moles of epichlorhydrin with a mole of dihydric phenol in the presence of a base such as sodium, potassium, calcium or barium hydroxide in amount of about 10% to 30% stoichiometric excess of base to epichlorhydrin—i. e., 1.1 to 1.3 equivalents of base per mole of epichlorhydrin. The reaction is effected in aqueous medium by first mixing together the water, dihydric phenol and the base, which mixture is then heated. The epichlorhydrin is added rapidly as a whole and heating is continued with agitation for several hours to convert the reactants to a taffy-like mass. If desired, the base may be added in portions during the course of the reaction. While hot, the agitated reaction product is washed with water until free of base. Although the product is a complex mixture of glycidyl ethers, the principal product may be represented by the formula:

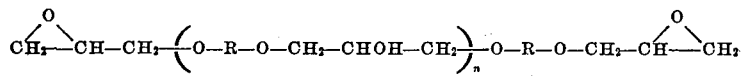

wherein R represents the divalent hydrocarbon radical of the dihydric phenol and $n$ is of the series 0, 1, 2, 3, etc. The length of the chain can be made to vary by changing the molecular proportion of epichlorhydrin to dihydric phenol. Thus by decreasing the moles of epichlorhydrin per mole of dihydric phenol from about two downwards toward one, the molecular weight and the softening point of the resinous glycidyl ether is increased. In general, these glycidyl ethers having an epoxy equivalency between 1.0 and 2.0 contain terminal 1,2-epoxy groups and have alternate aliphatic and aromatic nuclei linked together by ethereal oxygen atoms.

Any of the various dihydric phenols are suitable for preparation of the glycidyl ethers including mononuclear phenols like resorcinol, catechol, hydroquinone, etc., or polynuclear phenols like bis-phenol—i. e., bis-(4-hydroxyphenyl)-2,2-propane, or 4,4'-dihydroxybenzophenone, bis-(4-hydroxyphenyl)-1,1-ethane, bis-(4-hydroxyphenyl)-1,1-isobutane, bis-(4-hydroxyphenyl)-2,2-butane, bis-(4-hydroxy-2-methylphenyl)-2,2-propane, bis-(4-hydroxy-2-tertiary-butyl-phenyl)-2,2-propane, bis-(2-hydroxynaphthyl)-methane, 1,5-dihydroxynaphthalene, etc.

The following examples illustrate preparation of typical glycidyl ethers employed in the compositions of the invention, wherein the parts are by weight.

EXAMPLE I

A solution consisting of 11.7 parts of water, 1.22 parts of sodium hydroxide, and 13.38 parts of bis-phenol was prepared by heating the mixture of ingredients to 70° C. and then cooling to 46° C. at which temperature 14.06 parts of epichlorhydrin were added while agitating the mixture. After 25 minutes had elapsed, there was added during an additional 15 minutes' time a solution consisting of 5.62 parts of sodium hydroxide in 11.7 parts of water. This caused the temperature to rise to 63° C. Washing with water at 20° C. to 30° C. temperature was started 30 minutes later and continued for 4½ hours. The product was dried by heating to a final temperature of 140° C. in 80 minutes, and cooled rapidly. At room temperature, the product was an extremely viscous semi-solid having a melting point of 27° C. by Durran's Mercury Method and an epoxide equivalent weight of 249. For convenience, this product will be referred to hereinafter as Epoxy Resin I.

EXAMPLE II

Instead of using 2.6 moles of epichlorhydrin per mole of bis-phenol as described in the above example, there was employed only 2.0 moles of epichlorhydrin per mole of bis-phenol. About 798 parts of bis-phenol were dissolved in a caustic soda solution made by dissolving 200 parts of sodium hydroxide in 1730 parts of water in a stainless steel closed kettle. Epichlorhydrin in amount of 650 parts was then added in one portion to the closed kettle, the mixture being stirred during the addition. The temperature rose from 37° C. to 70° C. in 45 minutes. Caustic soda, 80 parts in 200 parts of water, was then added whereupon the temperature rose to about 82° C. during a further 30 minutes. Additional caustic soda, 29 parts in 100 parts of water, was then added and the kettle contents were heated. The temperature of the reaction mixture was gradually increased to about 95° C. in approximately 30 minutes. The aqueous liquor was next drawn off from the taffy-like product which had formed. The latter was washed with hot water while agitated and a series of washing treatments applied until the water was neutral to litmus. The product was then dried by heating to a final temperature of 130° C. and removed from the kettle. The softening point of the resulting glycidyl ether was 43° C. by Durran's Mercury Method and the epoxide equivalent weight was 325. The average molecular weight measured ebullioscopically in ethylene dichloride was 510. This product will be known hereinafter as Epoxy Resin II.

The glycidyl ether of a polyhydric phenol employed as principal resinifying constituent in the composition has a 1,2-epoxy equivalency greater than 1.0, and is usually between 1.0 and 2.0. The 1,2-epoxy equivalency is the value obtained upon dividing the average molecular weight of the ether by the epoxide equivalent weight thereof. Thus the epoxy equivalency of Epoxy Resin II was 1.57.

The epoxide equivalent weight of the glycidyl ethers of polyhydric phenols is determined by heating a one gram sample of the ether with an excess of pyridinium chloride dissolved in pyridine (made by adding pyridine to 16 cc. of concentrated hydrochloric acid to a total volume of one liter) at the boiling point for 20 minutes whereby the pyridinium chloride hydrochlorinates the epoxy groups to chlorhydrin groups. The excess pyridinium chloride is then back titrated with 0.1 N sodium hydroxide to the phenolphthalein end point. The epoxide value is calculated by considering one HCl as equivalent to one epoxide group. This method is used for obtaining all the epoxide values discussed herein.

The glycidyl ethers of polyhydric phenols employed as principal resinifying constituent in the compositions have a viscosity of at least 150 poises at 25° C. There is no particular upper limit for the viscosity although ethers having a melting or softening point above 160° C. by Durran's Mercury Method are rarely used. Thus the glycidyl ethers have a viscosity of at least 150 poises at 25° C., but the viscosity may be so high that the ethers are solids at this temperature. Best results are obtained with ethers having a Durran's Mercury Method melting point of from about 10° C. to 50° C. If these are glycidyl ethers of bis-phenol, they have an epoxide equivalent weight of about 225 to 400. In some cases, it may be desirable to use an ether having a melting point as high as 110° C.

The compositions of the invention contain sufficient normally liquid mono-epoxy compound mixed with the glycidyl ether of the polyhydric phenol that the composition has a spreadable fluidity at normal temperature. Ordinarily, it is preferred that the viscosity is about from 30 to 100 poises at 25° C. although it may be considerably less such as down as low as 3 poises. Most preferably, the viscosity is about 40 to 70 poises for suitable fluidity in adhesive applications, with which purpose the compositions are primarily concerned.

Since the compositions are particularly suited for use as adhesive wherein loss of the fluidity producing diluent in substantial quantity cannot be tolerated, it is essential that the normally liquid mono-epoxy compound be substantially non-volatile. It has been found that mono-epoxy compound with a boiling point of at least 100° C. is sufficiently non-volatile for this purpose, the boiling point being measured of course at 760 mm. of mercury. The mono-epoxy compounds employed as reactive diluents are mobile liquids at 25° C. In general, they are no more viscous than glycerine or preferably have a viscosity at 25° C. of less than 5 poises. Most of the compounds are not nearly so viscous as glycerine, many being only a little more viscous than water which has a viscosity of about 0.9 centipoise at 25° C. Thus, the viscosity of the mono-epoxy compound is ordinarily from about 1 to 500 centipoises at 25° C.

The reactive diluents contain but a single epoxy group in order to realize the advantages of the invention. Besides proper boiling point and viscosity, this is the only essential limitation on the suitability of any particular compound although it is preferred that the compound be devoid of other groups reactive with glycidyl ethers.

In being a mono-epoxy compound, customary usage of the word epoxy is employed, namely, that the compound contains a structure in which an oxygen atom has the two bonds thereof linked to different saturated carbon atoms which are vicinal carbon atoms or are linked directly together as is the case in the structure

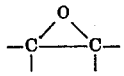

The epoxy groups may either be in terminal location or be interior groups. Among representative compounds suitable for the compositions are 2,3-hexylene oxide, 3,4-hexylene oxide, 3-ethyl-2,3-pentylene oxide, epichlorhydrin, epibromhydrin, octylene oxide, styrene oxide, glycide, decylene oxide and the like. Mono-glycidyl ethers constitute a preferred class and include among others methyl, ethyl, isopropyl, allyl, isoamyl, phenyl, o-tolyl, p-tolyl, thymyl and naphthyl glycidyl ethers.

In using the compositions of the invention, there is added a hardening agent to the spreadably fluid composition containing the mixture of the glycidyl ether of a polyhydric phenol which has a 1,2-epoxy equivalency greater than 1.0 with the mono-epoxy compound. Upon the addition, even at ordinary temperature, the composition begins to cure and become hard. A great variety of substances are now known to be hardening agents for the resin-forming ingredients such as alkalies like sodium or potassium hydroxides; alkali phenoxides like sodium phenoxide; carboxylic acids or anhydrides such as formic acid, oxalic acid or phthalic anhydride; Friedel-Craft metal halides like aluminum chloride, zinc chloride, ferric chloride or boron trifluoride as well as complexes thereof with ethers, acid anhydrides, ketones, diazonium salts, etc.; phosphoric acid and partial esters thereof including n-butyl orthophosphate, diethyl orthophosphate and hexaethyl tetraphosphate; and amino compounds such as triethyl amine, ethylene diamine, diethyl amine, diethylene triamine, triethylene tetramine, dicyandiamide, melamine and the like. The hardening agent is added and mixed in with the composition in order to effect hardening. The amounts vary considerably depending upon the particular agent employed. For the alkalies or phenoxides, 2 to 4 per cent is suitable. With phosphoric acid and esters thereof, good results are obtained with 1 to 10 per cent added. The amino compounds are used in amounts of about 5 to 15 per cent and the others involve addition of about 1 to 20 per cent.

In applying the composition for adhesive purposes, the glycidyl ether of the polyhydric phenol has added thereto sufficient mono-epoxy compound so that a spreadably fluid and homogeneous mixture is obtained. The hardening agent is then mixed with the composition and the mixture is applied as by spreading upon a surface desired to be united to another surface at a thickness of about 0.0005 to 0.1 inch thickness. The adhesive mixture is suitable for uniting various surfaces such as wood to wood, wood to metal, metal to metal, resin to resin or any combination thereof. After application and joinder of the surfaces desired to be united, the adhered articles are allowed to cure for a period of from about 30 minutes to a day or more, depending upon the hardening agent employed. In this time, the adhesive composition will set up to a solid which will permit ordinary handling thereof. Maximum strength for the adhesive layer will be reached within one or two weeks. While the application is effected at ordinary atmospheric temperature and the curing may also be permitted to occur at such temperatures, the curing may be effected in shorter times at elevated temperatures such as up to 75° C., 100° C., 150° C. or even higher in some cases. In cases where an elevated curing temperature is employed, the chosen temperature is below the boiling temperature of the lowest boiling component contained in the composition, and preferably, it is at least 20° C. below such boiling temperature.

In order to more fully understand the character of the invention, reference is made to the data collected in Table I below. This table reports compositions containing the glycidyl ether of bis-phenol prepared as described in Example II (Epoxy Resin II) in admixture with various mono-epoxy compounds. Sufficient mono-epoxy compound was added to give a spreadable consistency as indicated by the viscosities. An added 10% of the named amine was mixed in and one portion of the resulting mixture was allowed to cure at 77° F. for 6 days for determination of the hardness and another portion was used as an adhesive.

The adhesive properties were tested with blocks of about one quarter inch thickness consisting of linen cloth laminated with phenol-formaldehyde resin. The freshly prepared adhesive mixtures were spread on a one inch square surface of each of two phenolic blocks with the aid of a doctor blade having a clearance of 0.005 inch. The coated surfaces of the blocks were then united and the joined blocks were placed in a constant temperature room set at 77° F. Glued blocks were removed from the constant temperature room after 6 days' time and subjected to the block shear test of the Army-Navy-Civil Committee on Aircraft Design Criteria: "Wood Aircraft Inspection and Fabrication," ANC-19 (Dec. 20, 1943) discussed in an article by R. C. Rinker and G. M. Kline, Modern Plastics, vol. 23, p. 164, 1945. The values given in the table are the shear strengths in pounds per square inch for the compositions. For purposes of comparison, a composition containing diethylene glycol was also tested but it had no shear strength as an adhesive.

*Table I*

| Diluent in Admixture with Epoxy Resin II | Gardner-Holdt Viscosity of Mixture | Curing Agent Added 10% | Hardness after 6 days | Shear Strength, p. s. i. |
|---|---|---|---|---|
| 50% glycidyl phenyl ether. | N | DETA [1] | 52 | 110 |
| Do | do | TEA | 79 | 830 |
| Do | do | DEA | 75 | 540 |
| 30% glycidyl phenyl ether. | Z-4 | TEA | 92 | 1,310 |
| 21.5% glycidyl isopropyl ether. | Z-4 | DETA | 85 | 3,820 |
| 20% glycidyl allyl ether. | Z-4 | do | 85 | 3,550 |
| 27% styrene monoxide. | Z-3 | do | 52 | 2,050 |
| 50% β-methyl-glycidol. | | do | 52 | 350 |
| 50% diethylene glycol. | Z | do | Rubbery | None |

[1] Abbreviations for curing agents wherein DETA is diethylenetriamine, TEA is triethylamine and DEA is diethylamine.

Since adhesives for industrial use are subjected to contact with water, it is of importance that the cured compositions are not adversely affected upon such contact. In order to test the compositions in this respect, the compositions listed in Table II were prepared and allowed to cure for 14 days at 77° F. The Barcol hardness was then measured, and the cured resin samples were immersed in boiling water for 15 minutes after which the appearance was observed for change.

It was expected that the presence of the mono-epoxy compound in the mixture would result in poor water stability for the cured resin. It was found, however, that the water-stability was excellent. For purposes of comparison, a composition containing dibutyl phthalate was prepared, but as noted in the table, the cured product while having good water resistance was too soft to be useful. In similar manner, a composition containing the methyl ether of ethylene glycol monoacetate not only was soft, but also had no resistance against contact with water.

Table II

| Diluent in admixture with Epoxy Resin II | Per Cent Triethyl Amine Added | Barcol Hardness After 14 days | Appearance upon 15 min. contact with boiling water |
|---|---|---|---|
| 40% glycidyl phenyl ether | 8 | 24 | unchanged |
| 25.5% glycidyl allyl ether | 8 | 12 | Do. |
| 26.3% glycidyl isopropyl ether | 8 | 18 | Do. |
| 33.3% styrene monoxide | 10 | 29 | Do. |
| 52% dibutyl phthalate | 10 | 0 | Do. |
| 28% methyl ether of ethylene glycol acetate | 10 | 0 | melted |

In some cases, it is desirable to include an additional component in the compositions containing the glycidyl ether of a polyhydric phenol and a mono-epoxy compound. This extra component is a glycidyl ether of a polyhydric alcohol containing a plurality of glycidyl groups. These include such polyglycidyl ethers as diglycidyl ethers of ethylene glycol, propylene glycol, trimethylene glycol, butylene glycol, diethylene glycol, triethylene glycol, glycerol, tripropylene glycol, and the like as well as ethers containing more than two glycidyl groups such as the polyglycidyl ethers of glycerol, diglycerol, erythritol, pentaglycerol, pentaerythritol, mannitol, sorbitol, polyallyl alcohol, polyvinyl alcohol and the like. Such glycidyl ethers also have a 1,2-epoxy value greater than 1.0.

The polygylcidyl polyethers of the polyhydric alcohols are prepared by reacting the polyhydric alcohol with epichlorhydrin in the presence of 0.1 to 2% of an acid-acting compound as catalyst such as boron trifluoride, hydrofluoric acid or stannic chloride whereby the chlorhydrin ether is formed as product. The reaction is effected at about 50° C. to 125° C. with the proportions of reactants being such that there is about one mole of epichlorhydrin for each molecular equivalent of hydroxyl group in the polyhydric alcohol. Thus, in preparing the ether of diethylene glycol, which glycol contains two hydroxyl groups in each molecule thereof, about two moles of epichlorhydrin for each mole of diethylene glycol are used. The resulting chlorhydrin ether from the reaction of a polyhydric alcohol with epichlorhydrin is dehydrochlorinated by heating at about 50° C. to 125° C. with a small, say 10%, stoichiometrical excess of a base. For this purpose, sodium aluminate gives good results.

Preparation of the polyglycidyl ethers of polyhydric alcohols may be illustrated by considering application of the above method to preparation of the polyglycidyl ether of glycerol.

EXAMPLE III

In parts by weight, about 276 parts of glycerol (3 moles) were mixed with 828 parts of epichlorhydrin (9 moles). To this reaction mixture were added 10 parts of a diethyl ether solution containing about 4.5% of boron trifluoride. The temperature rose as a result of the exothermic reaction and external cooling with ice water was applied so as to keep the temperature between about 50° C. and 75° C. during a reaction period of about 3 hours. About 370 parts of the resulting glycerol-epichlorhydrin condensate were dissolved in 900 parts of dioxane containing about 300 parts of sodium aluminate. While agitating, the reaction mixture was heated and refluxed at 93° C. for 9 hours. After cooling to atmospheric temperature, the insoluble material was filtered from the reaction mixture and low boiling substances removed by distillation to a temperature of about 205° C. at 20 mm. pressure. The polyglycidyl ether, in amount of 261 parts, was a pale yellow, viscous liquid. It had an epoxide value of 0.671 equivalents per 100 grams and the molecular weight was 324 as measured ebulloscopically in a dioxane solution. These values showed that the polyglycidyl ether had a 1,2-epoxy equivalency of 2.18—i. e., an average of about 2.2 epoxide groups per molecule. For convenience, this product will be known as "Epoxy Resin III."

Various proportions of the polyglycidyl ether of a polyhydric alcohol is used in admixture with the glycidyl ether of a polyhydric phenol such as an added 0 to 200%. Sufficient mono-epoxy compound is also admixed therewith to adjust the viscosity to the desired value. In general, the three component compositions contain about 50 to 80% of the glycidyl ether of a polyhydric phenol, about 10 to 40% of the polyglycidyl ether of a polyhydric alcohol and about 1 to 30% of the mono-epoxy reactive diluent, the total of the percentage, of course, being 100. The proportions may vary from these, depending upon the fluidity of particular components, since having the whole composition or mixture at a spreadable consistency is the important feature of the invention, and not particular numerical limits for the constituents in the composition.

The compositions shown in Table III illustrate three-component mixtures of the invention, and demonstrate the superior properties, especially the resistance to the action of water, of the cured compositions containing a mono-epoxy compound.

The viscosities of the compositions noted in Table III were determined in terms of the Gardner-Holdt viscosity scale before addition of the hardening agent. To each of the compositions, there was mixed an added 12.5% of triethylamine as hardening agent. The resulting mixture was then applied as adhesive to phenolic laminated linen blocks and permitted to cure at 77° F. for 144 hours after which the shear strength was determined as described hereinbefore both before and after the indicated water treatments.

Table III

| Composition | | | Viscosity of Mixture | P. S. I. Shear Strength After— | | |
|---|---|---|---|---|---|---|
| Epoxy Resin I | Epoxy Resin III | AGE[1] | | 144 hrs. cure | 144 hrs. Cure Plus 1 hour in Boiling H₂0 | 144 hrs. Cure Plus 1 Month in H₂0 |
| *Per cent* 100 | *Per cent* 0 | *Per cent* 0 | Z-8 | 250 | 410 | Soaked apart |
| 80.9 | 14.3 | 4.8 | Z-4 | 4,020 | 4,280 | 3,990 |
| Epoxy Resin II | | | | | | |
| 70 | 30 | 0 | Z-8 | 1,590 | Boiled apart | 2,090 |
| 68 | 17 | 15 | Z-2 | 4,175 | 4,580 | 2,725 |

[1] Allyl glycidyl ether.

Some additional compositions with three reactive components containing epoxy groups are listed in Table IV. Upon addition of the noted hardening agent, and allowing the mixtures to remain at 22–25° C. for 14 days, there was obtained a hard, resinous mass. The proportions of ingredients were regulated so that the compositions had a viscosity of W on the Gardner-Holdt scale. The cured compositions in all cases were unaffected after 15 minutes immersion in acetone, or 15 minutes immersion in boiling water. For purposes of comparison, the table includes results with a composition containing the monomethyl ether of ethylene glycol monoacetate (methyl cellosolve acetate) as fluidizing agent, which composition was soft with a Barcol hardness of zero after curing.

Table IV

| Composition | | | Added Curing Agent | Barcol Hardness After 14 days |
|---|---|---|---|---|
| Epoxy Resin II | Epoxy Resin III | Mono-epoxy Compound | | |
| *Per cent* 41.6 | *Per cent* 41.6 | 16.8% phenyl glycidyl ether. | 10% DETA[1] | 13 |
| 41.6 | 41.6 | ___do___ | 10% TEA[2] | 16 |
| 45.7 | 45.7 | 8.6% allyl glycidyl ether. | 12% DETA | 14 |
| 45.7 | 45.7 | ___do___ | 12% TEA | 19 |
| 45.5 | 45.5 | 9.0% isopropyl glycidyl ether. | 10% DETA | 21 |
| 45.5 | 45.5 | ___do___ | 12% TEA | 10 |
| 43.9 | 43.9 | 12.2% styrene monoxide. | 12% DETA | 26 |
| 43.9 | 43.9 | ___do___ | 12% TEA | 22 |
| 45.5 | 45.5 | 9.0% methylcellosolve acetate. | 10% DETA | 0 |
| 45.5 | 45.5 | ___do___ | 10% TEA | 0 |

[1] Diethylene triamine.
[2] Triethylamine.

The compositions of the invention are particularly adapted for use in bonding together of solid surfaces which may be of any suitable variety or combination such as wood to wood, wood to resin, resin to resin, metal to metal, metal to wood, metal to glass, glass to glass, etc. The surfaces may be either smooth or rough though in all cases it is desirable that they be clean—i. e., free of oil or grease.

We claim as our invention:

1. A composition essentially comprising a spreadably fluid mixture of (1) glycidyl ether of a polyhydric phenol having a 1,2-epoxy equivalency greater than 1.0 and (2) a liquid mono-epoxy compound wherein each bond of the epoxy oxygen atom is linked directly to separate vicinal saturated carbon atoms and which compound has a boiling point of at least 100° C. at normal atmospheric pressure, which mono-epoxy compound is present in such proportion that said mixture has a viscosity of 3 to 100 poises at 25° C.

2. A composition essentially comprising a spreadably fluid mixture of (1) glycidyl ether of a dihydric phenol having a 1,2-epoxy equivalency greater than 1.0 and a viscosity of at least 150 poises at 25° C., and a fluidizing proportion of (2) a liquid mono-epoxy compound wherein each bond of the epoxy oxygen atom is linked directly to separate vicinal saturated carbon atoms, which compound has a viscosity below 5 poises at 25° C. and a boiling point of at least 100° C. at normal atmospheric pressure, and which compound is present in such proportion that said mixture has a viscosity of 30 to 100 poises at 25° C.

3. A composition essentially comprising a spreadably fluid mixture of (1) glycidyl ether of a dihydric phenol having a 1,2-epoxy equivalency between 1.0 and 2.0 and a viscosity of at least 150 poises at 25° C., and (2) a monoglycidyl ether having a viscosity below 5 poises at 25° C., which monoglycidyl ether is present in such proportion that said mixture has a viscosity of 30 to 100 poises at 25° C.

4. A composition essentially comprising a spreadably fluid mixture of (1) glycidyl ether of bis-(4-hydroxy-phenyl)-2,2-propane having a 1,2-epoxy equivalency between 1.0 and 2.0 and a Durran's Mercury Method softening point of 10° C. to 110° C., and (2) allyl glycidyl ether which is present in such proportion that said mixture has a viscosity of 30 to 100 poises at 25° C.

5. A composition essentially comprising a spreadably fluid mixture of (1) glycidyl ether of bis-(4-hydroxy-phenyl)-2,2-propane having a 1,2-epoxy equivalency between 1.0 and 2.0 and a Durran's Mercury Method softening point of 10° C. to 110° C., and (2) phenyl glycidyl ether which is present in such proportion that said mixture has a viscosity of 30 to 100 poises at 25° C.

6. A composition essentially comprising a spreadably fluid mixture of (1) glycidyl ether of bis-(4-hydroxy-phenyl)-2,2-propane having a 1,2-epoxy equivalency between 1.0 and 2.0 and a Durran's Mercury Method softening point of 10° C. to 110° C., and (2) styrene monoxide which is present in such proportion that said mixture has a viscosity of 30 to 100 poises at 25° C.

7. A composition essentially comprising a spreadably fluid mixture of (1) glycidyl ether of a polyhydric phenol having a 1,2-epoxy equivalency greater than 1.0 (2) a polyglycidyl polyether of a polyhydric alcohol, and at least 1% of (3) a liquid mono-epoxy compound wherein each bond of the epoxy oxygen atom is linked directly to separate vicinal saturated carbon atoms, which mono-epoxy compound has a boiling point of at least 100° C. at normal atmospheric pressure and is present in such proportion that said mixture has a viscosity of 30 to 100 poises at 25° C.

8. A composition essentially comprising a spreadably fluid mixture of 50 to 80% glycidyl ether of a dihydric phenol having a 1,2-epoxy equivalency between 1.0 and 2.0 and a viscosity of at least 150 poises at 25° C., 10 to 40% of a glycidyl ether of an aliphatic polyhydric alcohol containing a plurality of glycidyl groups, and 1 to 30% of a monoglycidyl ether having a viscosity below 5 poises at 25° C., the sum of the percentages being 100 and the viscosity of said mixture being not greater than 100 at 25° C.

9. A mixture of 50 to 80% glycidyl ether of bis-(4-hydroxy-phenyl)-2,2-propane having a 1,2-epoxy equivalency between 1.0 and 2.0 and a Durran's Mercury Method softening point of 10° C. to 110° C., 10 to 40% of polyglycidyl ether of glycerol, and 1 to 30% of allyl glycidyl ether, the sum of the percentages being 100 and the viscosity of said mixture being 30 to 100 poises at 25° C.

QUENTIN T. WILES.
HERBERT A. NEWEY.

REFERENCES CITED

The following references are of record in the file of this patent:

UNITED STATES PATENTS

| Number | Name | Date |
|---|---|---|
| 2,324,483 | Castan | July 20, 1943 |
| 2,444,333 | Castan | June 29, 1948 |
| 2,467,171 | Werner et al. | Apr. 12, 1949 |